United States Patent [19]

Yamashita

[11] Patent Number: 5,265,694
[45] Date of Patent: Nov. 30, 1993

[54] SLIP CONTROL SYSTEM FOR VEHICLE

[75] Inventor: Tetsuhiro Yamashita, Hiroshima, Japan

[73] Assignee: Mazda Motor Corporation, Hiroshima, Japan

[21] Appl. No.: 9,993

[22] Filed: Jan. 27, 1993

[30] Foreign Application Priority Data

Feb. 17, 1992 [JP] Japan .................................. 4-29589

[51] Int. Cl.⁵ .............................................. B60T 8/58
[52] U.S. Cl. .................................... 180/197; 303/95; 303/100; 303/103; 364/426.02; 364/426.03
[58] Field of Search ............... 180/197; 303/95, 100, 303/103; 364/426.02, 426.03

[56] References Cited

U.S. PATENT DOCUMENTS

| 5,164,902 | 11/1992 | Kopper et al. | 180/197 |
| 5,171,070 | 12/1992 | Okazaki et al. | 303/103 |
| 5,176,444 | 1/1993 | Kageyama et al. | 303/100 |

FOREIGN PATENT DOCUMENTS 1-197160  8/1989  Japan .

Primary Examiner—Mitchell J. Hill
Attorney, Agent, or Firm—Sixbey, Friedman, Leedom & Ferguson

[57] ABSTRACT

A total slip control system for a vehicle effects both the traction control and the anti-skid control. The traction control is effected by control of the engine output torque and application of brake to the driving wheel. The traction control is completely interrupted and the anti-skid control is initiated when the anti-skid control initiating condition is satisfied during the traction control in a high vehicle speed range lower than a predetermined value and the traction control by application of brake is interrupted with the traction control by control of the engine output torque continued and the anti-skid control is initiated when the anti-skid control initiating condition is satisfied during the traction control in a low vehicle speed range lower than the predetermined value.

6 Claims, 6 Drawing Sheets

SLIP CONTROL SYSTEM FOR VEHICLE

BACKGROUND OF THE INVENTION

1. Field of the Invention

This invention relates to a slip control system for a vehicle, and more particularly to a slip control system for a vehicle which controls the driving force of the driving wheels when the driving wheels slip due to excessive driving force and controls the braking force applied to the brakes when the wheels tend to lock.

2. Description of the Prior Art

When the driving force of the driving wheels is excessive during acceleration of the vehicle, the driving wheels can slip and the accelerating performance can deteriorate. Thus there has been known a slip control system (traction control system) which, when the slip of the driving wheels relative to the road surface reaches a predetermined value, controls the driving force of the driving wheels so that the slip of the driving wheels converges on a target value. In such a slip control system, the driving force of the driving wheels is controlled by controlling the engine output power and/or applying the braking to the driving wheels.

When the braking force applied to each wheel is excessive during braking, the wheel tends to lock, which can cause skid of the vehicle. Thus there has been known a slip control system (antiskid brake system) which, when the slip of each wheel relative to the road surface reaches a predetermined value, controls the braking force applied to the wheel so that the slip of the wheel converges on a target value.

Further, as disclosed, for instance, in Japanese Unexamined Patent Publication No. 1(1989)-197160, there has been known a slip control system which controls both the driving force of the driving wheels and the braking force applied to each wheel. For the purpose of simplicity, control of the driving force of the driving wheels will be referred to as "traction control" and control of the braking force for preventing lock of the wheels during braking will be referred to as "anti-skid control", and a slip control system which performs both the traction control and the anti-skid control will be referred to as "total slip control system", hereinbelow.

In such a total slip control system, it is important to avoid interference between the traction control and the anti-skid control in order to prevent malfunction of the system. For this purpose, in the total slip control system disclosed in the above identified patent publication, the traction control is inhibited during the anti-skid control.

In view of the safety, it will be preferred that the anti-skid control be performed in preference to the traction control. However if the traction control is interrupted and the anti-skid control is initiated whenever the condition for initiating the anti-skid control is satisfied, the following problem arises.

That is, as a situation where the anti-skid control initiating condition is satisfied during the traction control, there can be supposed a case where the driving wheels are decelerated by engine brake effect in response to a downshift during acceleration. In such a case, slip of the wheels due to the engine brake effect can be suppressed by interrupting the traction control and initiating the anti-skid control. There sometimes happens a situation where the traction control is to be resumed after slip of the wheels is suppressed. Such a situation is apt to occur at a relatively low vehicle speed, and there arises a problem that the controlling accuracy deteriorates as compared with the case where the traction control is continued together with the anti-skid control since various processings required for the traction control such as determination of the friction coefficient of the road surface must be effected again in response to shift from the anti-skid control to the traction control and since it takes some time to end the anti-skid control.

SUMMARY OF THE INVENTION

In view of the foregoing observations and description, the primary object of the present invention is to provide a total slip control system for a vehicle in which the traction control and the anti-skid control conform to each other in an optimal manner in view of the safety while the control is quickly shifted to the traction control from the anti-skid control in case of necessity.

In accordance with one aspect of the present invention, the total slip control system effects the traction control by control of the engine output torque and application of brake to the driving wheel, and the traction control is completely interrupted and the anti-skid control is initiated when the anti-skid control initiating condition is satisfied during the traction control in a high vehicle speed range lower than a predetermined value, e.g., 80 Km/h and the traction control by application of brake is interrupted with the traction control by control of the engine output torque continued and the anti-skid control is initiated when the anti-skid control initiating condition is satisfied during the traction control in a low vehicle speed range lower than the predetermined value.

In the low vehicle speed range, behavior of the vehicle does not become unstable even if the traction control by the engine output torque control and the anti-skid control are simultaneously effected. Accordingly, by completely interrupting the traction control when the anti-skid control initiating condition is satisfied during the traction control in the high vehicle speed range, and by interrupting only the traction control by application of brake when the anti-skid control initiating condition is satisfied during the traction control in the low vehicle speed range, the above object can be accomplished.

In accordance with another aspect of the present invention, the total slip control system effects the traction control only by control of the engine output torque, and the traction control is interrupted and the anti-skid control is initiated when the anti-skid control initiating condition is satisfied during the traction control in a high vehicle speed range lower than a predetermined value, and the traction control is continued and the anti-skid control is initiated when the anti-skid control initiating condition is satisfied during the traction control in a low vehicle speed range lower than the predetermined value.

The predetermined vehicle speed depends on the type of a vehicle and corresponds to a vehicle speed above which behavior of the vehicle becomes unstable when the traction control and the anti-skid control are simultaneously effected.

DESCRIPTION OF THE PREFERRED EMBODIMENT

Figure 1:
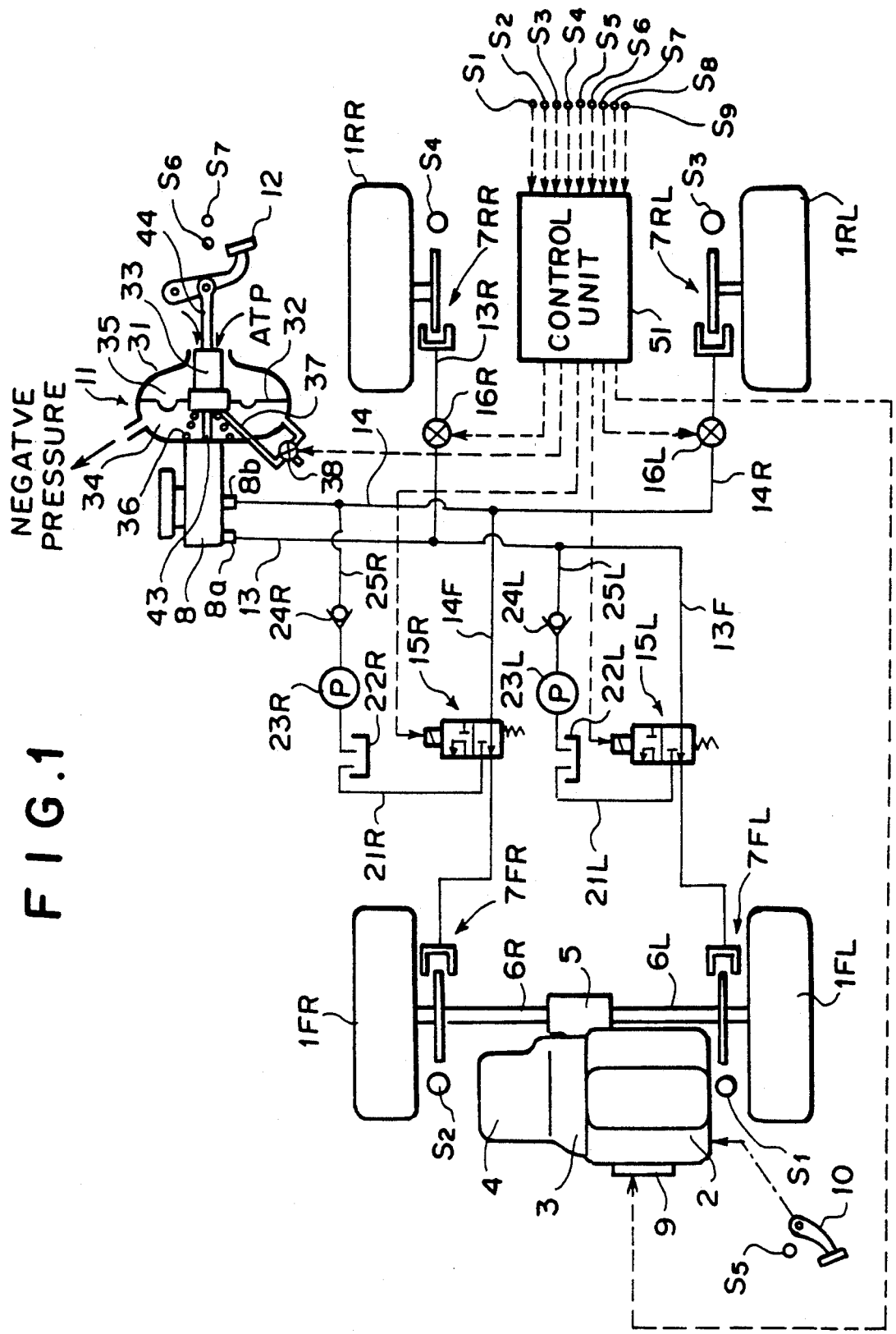
FIG. 1 is a schematic view showing a vehicle provided with a total slip control system in accordance with an embodiment of the present invention.

In FIG. 1, a vehicle provided with a total slip control system in accordance with an embodiment of the present invention has left and right front wheels 1FL and 1FR, left and right rear wheels 1RL and 1RR and an engine disposed sideways in the front of the vehicle body. The output torque of the engine 2 is transmitted to the left and right front wheels 1FL and 1FR through a clutch 3, a transmission 4, a differential 5 and left and right drive shafts 6L and 6R. That is, the vehicle is a front-engine front-drive car.

The wheels 1FL, 1FR, 1RL and 1RR are respectively provided with hydraulic disk brakes 7FL, 7FR, 7RL and 7RR. A master cylinder 8 is of a tandem type having a pair of discharge ports 8a and 8b. A brake line 13 extending from the discharge port 8a branches into branch lines 13F and 13R. The branch brake line 13F is connected to a brake 7FL for the left front wheel 1FL and the branch brake line 13R is connected to a brake 7FR for the right rear wheel 1RR. A brake line 14 extending from the other discharge port 8b branches into branch lines 14F and 14R. The branch brake line 14F is connected to a brake 7FR for the right front wheel 1FR and the branch brake line 14R is connected to a brake 7RL for the left rear wheel 1RL.

The branch brake line 13F and 14F for the front or driving wheels 1FL and 1FR are respectively provided with electromagnetic pressure regulator valves 15L and 15R, and the branch brake lines 13R and 14R for the rear wheels 1RL and 1RR are respectively provided with electromagnetic on-off valves 16L and 16R. The pressure regulator valves 15L and 15R shifted between positions where the brake fluid pressure from the mater cylinder 8 is applied to the brakes 7FL and 7FR and positions where the brake fluid pressures in the brakes 7FL and 7FR are released to reservoir 22L and 22R through lines 21L and 21R. The brake fluid in the reservoir 22L is returned to the brake line 13 by a pump 23L through a line 25L provided with a check valve 24L. The brake fluid in the reservoir 22R is returned to the brake line 14 by a pump 23R through a line 25R provided with a check valve 24R.

The pressure regulator valves 15L and 15R and the on-off valves 16L and 16R are controlled by a control unit 51.

When a brake pedal 12 is pushed down, the pedal depressing force is transmitted to the master cylinder 8 by way of a booster 11. This booster 11 is basically a known vacuum booster but is caused to act on the master cylinder 8 to produce braking pressure even if the brake pedal 12 is not depressed under the control of the control unit 51 as will be described later.

The booster 11 has a casing 31 which is fixed to the vehicle body and the master cylinder 8, and the inner space of the casing 31 is divided into first and second chambers 34 and 35 by a diaphragm 32 and a valve body 33 fixed to the diaphragm 32. The first chamber 34 is constantly fed with a negative pressure (e.g., intake vacuum of the engine 2), and the first and second chambers 34 and 35 are communicated with each other and the booster 11 does not function when the brake pedal 12 is released. When the brake pedal 12 is pushed down, atmospheric pressure is introduced into the second chamber 35 and causes the diaphragm 32 and the valve body 33 to move forward, whereby the pedal depressing force is multiplied.

Figure 2:
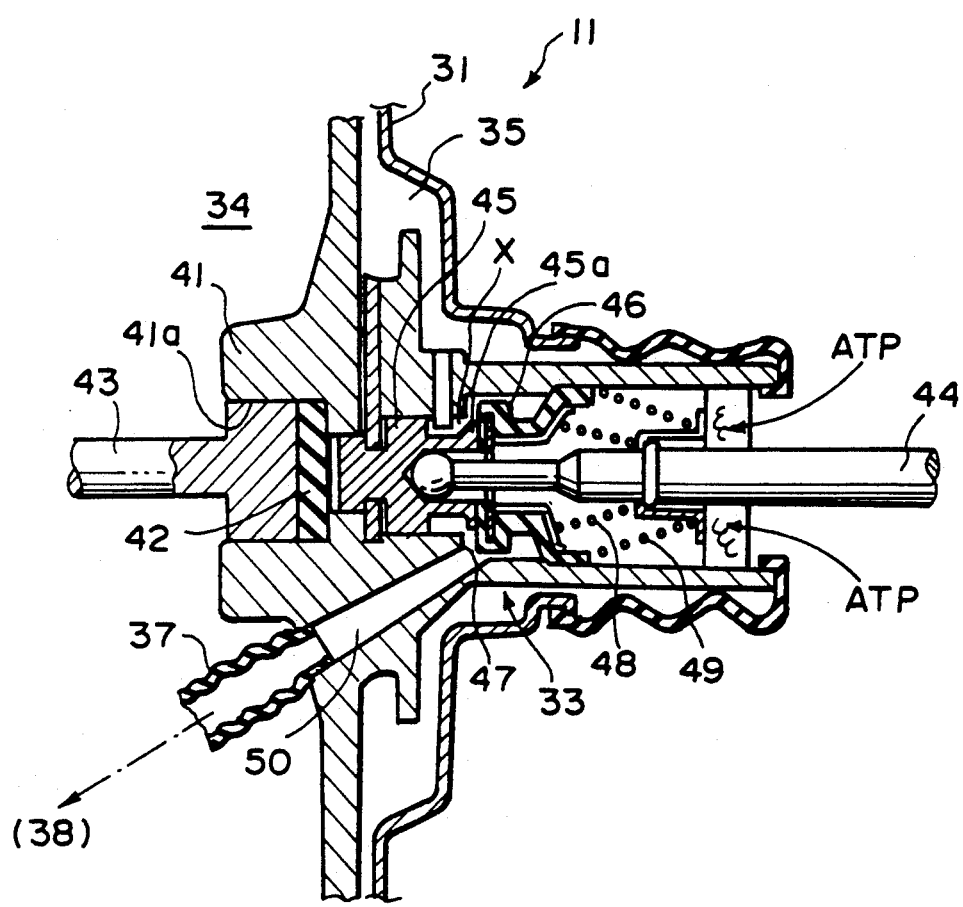
FIG. 2 is a fragmentary cross-sectional view showing the booster employed in the system.

As shown in FIG. 2, the valve body 33 has a power piston 41 which is fixed to the diaphragm 32. The power piston 41 has a recess 41a and a reaction disk 42 and one end portion of an output shaft 43 are fitted in the recess 41a. The output shaft 43 forms an input shaft of the master cylinder 8. A valve plunger 45 is disposed in the valve body 33 and is mounted on one end of an input shaft 44 which is connected to the brake pedal 12 at the other end. A vacuum valve 46 is disposed behind the valve plunger 45.

A pressure passage 50 is formed in the power piston 41 and is normally communicated with a space X around the valve plunger 45. The space X is normally communicated with the second chamber 35. A valve seat 47 for the vacuum valve 46 is formed at the end of the pressure passage 50 on the side of the space X. The vacuum valve 46 is moved toward and away from the valve seat 47 to close and open the pressure passage 50. Further the vacuum valve 46 is brought into contact with and moved away from another valve seat 45a formed on the read end of the valve plunger 45.

In the state where a negative pressure is applied to the pressure passage 50 with the brake pedal 12 released, the vacuum valve 46 is kept in contact with the valve seat 45a under the force of springs 48 and 49 and is kept away from the valve seat 47 as shown in FIG. 2. In this state, the negative pressure in the pressure passage 50 is introduced into the second chamber 35 and accordingly, the booster 11 does not act on the master cylinder 8.

When the brake pedal 12 is pushed down, the valve plunger 45 is moved forward (left in FIG. 2) together with the input shaft 44. In response to the movement of the valve plunger 45, the vacuum valve 46 is first seated in the valve seat 47 to break the communication between the space X and the pressure passage 50 and thereafter the vacuum valve 46 is moved away from the valve seat 45a. When the vacuum valve 46 is moved away from the valve seat 45a, atmospheric pressure is introduced into the space X from behind the valve body 33. This displaces forward the valve body 33 together with the diaphragm 32, whereby the output shaft 43 moves forward and the pedal depressing force is multiplied. Counterforce from the master cylinder 8 is transmitted to the brake pedal 12 through the reaction disk 42 and the valve plunger 45. When the brake pedal 12 is released, the booster 11 returns to the state shown in FIG. 2 under the force of a return spring 36 (FIG. 1).

Further, the pressure passage 50 is connected to the first chamber 34 through a line 37 which is provided with a three-way solenoid valve 38 (FIG. 1) which controlled by the control unit 51. The solenoid valve 38 communicates the pressure passage 50 with the first chamber 34 when it is not energized and opens the pressure passage to the atmosphere when it is energized. When the solenoid valve 38 is energized, atmospheric pressure is introduced into the second chamber 35 through the space X and the master cylinder 8 is caused to produce braking pressure.

As shown in FIG. 1, signals from sensors S1 to S4 and switches S5 to S9 are input into the control unit 51. The sensors S1 to S4 are wheel speeds sensors which respectively detect the rotational speeds of the left and right front wheels 1FL and 1FR and the left and right rear wheels 1RL and 1RR. The switch S5 is an accelerator switch which is turned on when the accelerator pedal 10 is released, and the switches S6 and S7 are brake switches which are operated in response to depression of the brake pedal 12, one being of a normally-closed type and the other being of a normally-open type. The switch S8 is a parking brake switch which is turned on when the parking brake (not shown) is applied. The switch S9 is a manual switch which releases a hill holder mechanism (not shown).

The control unit 51 controls an engine output control means 9 which controls the output torque of the engine 2). The engine output control means 9 may controls the engine output torque by control of the amount of intake air, control of the number of cylinders cut with fuel, control of ignition timing or combination of two or more of them. In this particular embodiment, the engine output torque control means 9 controls the opening of a sub throttle valve (not shown) disposed downstream of a main throttle valve.

The control unit 51 performs both the anti-skid control during braking and the traction control during acceleration. The control unit 51 effects the anti-skid control by controlling the brakes 7FL, 7FR, 7RL and 7RR by way of the three-way solenoid valve 38, the pressure regulator valves 15L and 15R and the on-off valves 16L and 16R. The control unit 51 effects the traction control by controlling the brakes 7FL and 7FR by way of the three-way solenoid valve 38 and the pressure regulator valves 15L and 15R and controlling the engine output torque by way of the engine output control means 9.

The traction control is separately effected for the left and right front (driving) wheels. For example the traction control on the left front wheel 1FL is effected in the following manner.

That is, the control unit 51 first reads out an engine control threshold value $S_{EO}$ for initiating the control of engine output torque, an engine control target slip ratio $S_E$, a brake control threshold value $S_{BO}$ for initiating the control of the brake 7FL in the traction control and a brake control target slip ratio $S_B$ from a table which has been set using the road surface friction coefficient $\mu$ (estimated on the basis of the mean rear wheel speed $V_R$ and the rear wheel acceleration $A_R$ obtained from the mean rear wheel speed $V_R$) as a parameter. The relations between the the road surface friction coefficient $\mu$ and the engine control threshold value $S_{EO}$, the engine control target slip ratio $S_E$, the brake control threshold value $S_{BO}$ and the brake control target slip ratio $S_B$ are as shown in the following table 1. In this particular embodiment, the engine control threshold value $S_{EO}$ is equal to the engine control target slip ratio $S_E$ and the brake control threshold value $S_{BO}$ is equal to the brake control target slip ratio $S_B$.

TABLE 1

| $\mu$ | 1 | 2 | 3 | 4 | 5 |
|---|---|---|---|---|---|
| $S_{EO}$ | 2 | 3 | 4 | 5 | 6 |
| $S_E$ | 2 | 3 | 4 | 5 | 6 |
| $S_{BO}$ | 3 | 4 | 5 | 6 | 7 |
| $S_B$ | 3 | 4 | 5 | 6 | 7 |

In the table, the engine control threshold value $S_{EO}$, the brake control threshold value $S_{BO}$, the engine control target slip ratio $S_E$ and the brake control target slip ratio $S_B$ are set as values of the slip ratio of the left front wheel 1FL relative to the road surface. In order to distinguish the slip ratio used in the traction control from that used in the anti-skid control, the former will be referred to as "the driving slip ratio" while the latter will be referred to as "the braking slip ratio", hereinbelow.

The control unit 51 calculates the driving slip ratio $S_{A1}$ of the left front wheel 1FL according to the following formula 1 on the basis of the wheel speed $V_{FL}$ of the left front wheel 1FL and the mean rear wheel speed $V_R$.

$$S_{A1}=(V_{FL}-V_R)/V_{FL} \tag{1}$$

Figure 3:
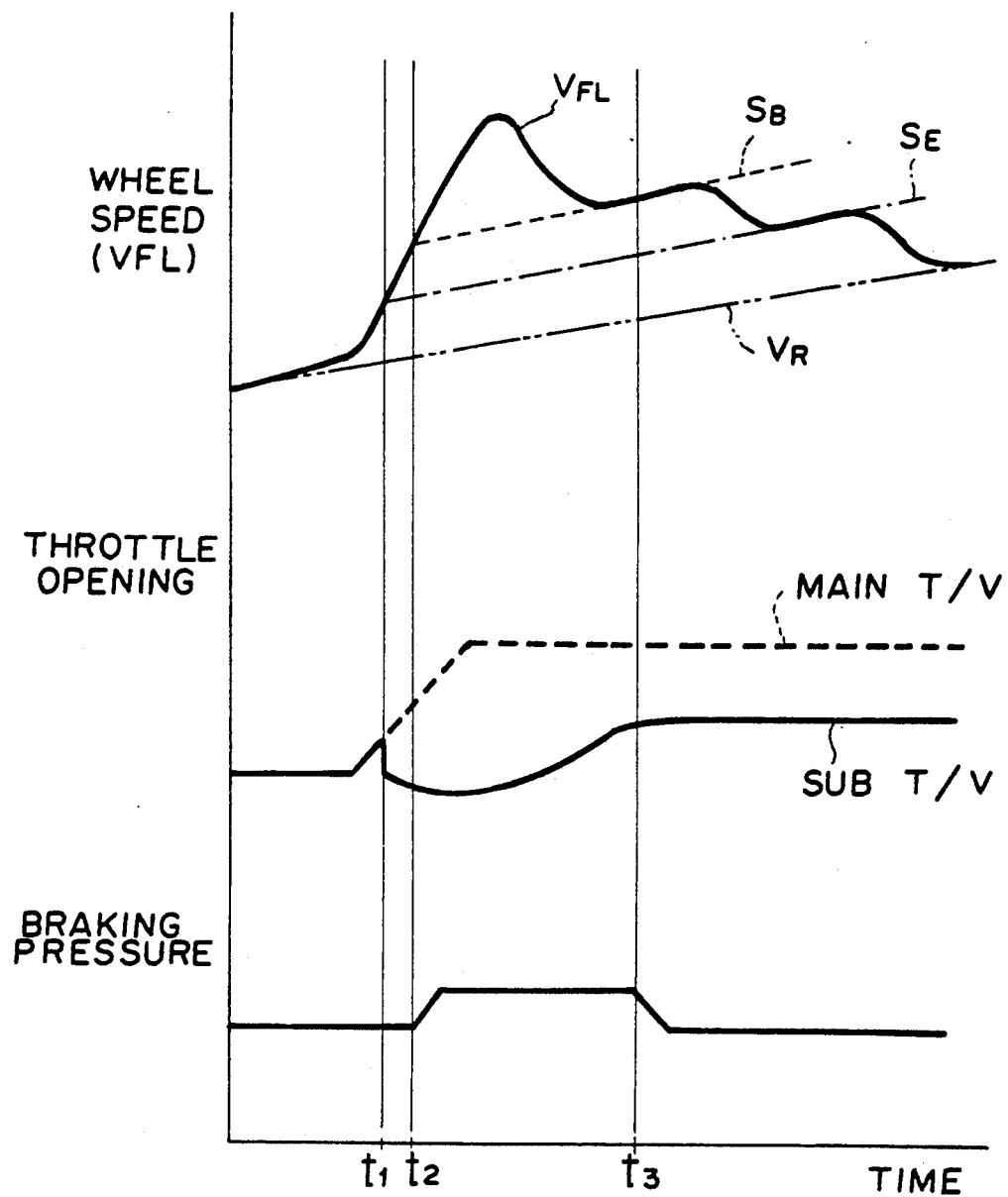
FIG. 3 is a time chart for illustrating an example of the traction control.

As shown in FIG. 3, the control unit 51 initiates the traction control by the engine output torque control at time t1 at which the driving slip ratio $S_{A1}$ exceeds the engine control threshold value $S_{EO}$, and causes the engine output torque control means 9 to feedback-control the sub throttle valve so that the driving slip ratio $S_{A1}$ converges on the engine control target slip ratio $S_E$.

When the driving slip ratio of the left front wheel 1FL is not reduced and the left front wheel speed $V_{FL}$ keeps to increase even after the initiation of the engine output torque control, the control unit 51 causes the pressure regulator valve 15L and the three-way solenoid valve 38 to apply a braking pressure to the brake 7FL for the left front wheel 1FL, thereby effecting the traction control by application of the brake together with the traction control by the engine output torque control, at time t2 at which the driving slip ratio $S_{A1}$ exceeds the brake control threshold value $S_{BO}$. The braking pressure is feedback-controlled so that the driving slip ratio $S_{A1}$ converges on the brake control target slip ratio $S_B$.

At time t3 the driving slip ratio $S_{A1}$ is reduced to the brake control target slip ratio $S_B$, the traction control by application of the brake is interrupted and the braking pressure is released. The traction control by the engine output torque control is continued until a predetermined condition is satisfied.

The traction control on the right front wheel 1FR is effected in the same manner on the basis of the driving slip ratio $S_{A2}$ of the right front wheel 1FR obtained by the following formula.

$$S_{A2}=(V_{FR}-V_R)/V_{FR}$$

wherein $V_{FR}$ represents the wheel speed of the right front wheel 1FR.

The anti-skid control is separately effected for the wheels 1FL, 1FR, 1RL and 1RR. For example the anti-skid control on the left front wheel 1FL is effected in the following manner.

That is, the control unit 51 first calculates the braking slip ratio $S_{ABS1}$ of the left front wheel 1FL according to the following formula (2) on the basis of the left front wheel speed $V_{FL}$ and an estimated vehicle speed $V_E$ (to be described later).

$$S_{ABS1}=(V_E-V_{FL})/V_E \tag{2}$$

When the braking slip ratio $S_{ABS1}$ exceeds an anti-skid control threshold value $S_{ABS}$, the control unit 51 controls the braking pressure applied to the brake 7FL for the left front wheel 1FL so that the braking slip ratio $S_{ABS1}$ converges on a target braking slip ratio which is equal to the anti-skid control threshold value $S_{ABS}$ in this particular embodiment.

Figure 4:
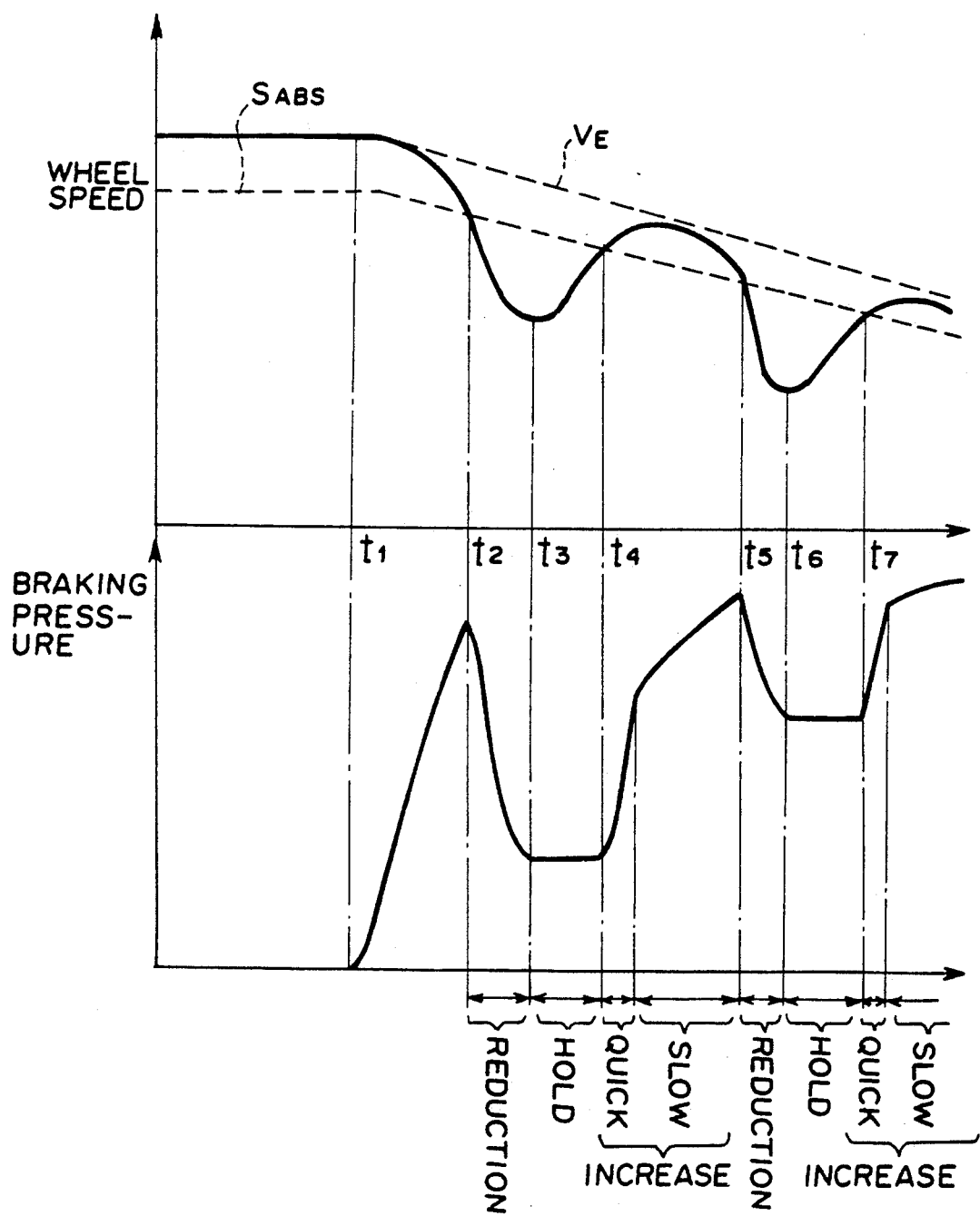
FIG. 4 is a time chart for illustrating an example of the anti-skid control.

For example, as shown in FIG. 4, supposing that the brake pedal 12 is pushed down at time t1, the left front wheel speed $V_{FL}$ reduces and the braking slip ratio $S_{ABS1}$ increases in response to increase in the braking pressure applied to the brake 7FL. When the left front wheel speed $V_{FL}$ continues to reduce and the braking slip ratio $S_{ABS1}$ exceeds the anti-skid control threshold value $S_{ABS}$ at time t2, the control unit 51 determines that the left front wheel 1FL tends to lock and begins to reduce the braking pressure applied to the brake 7FL.

As the estimated vehicle speed $V_E$, a value obtained, for instance, by subtracting an acceleration determined according to the friction coefficient $\mu$ of the road surface ($-1.2$ g to $-0.3$ g) from the highest speed in the wheel speeds of the four wheels or a vehicle speed (a wheel speed) just before the application of the brake can be used.

At time t3 at which increase in the braking slip ratio $S_{ABS1}$ stops, the control unit 51 hold the braking pressure. When the left front wheel speed $V_{FL}$ subsequently increases and the braking slip ratio $S_{ABS1}$ reduces below the anti-skid control threshold value $S_{ABS}$ at time t4, the control unit 51 increases the braking pressure first quickly and then slowly until the braking slip ratio $S_{ABS1}$ exceeds the anti-skid control threshold value $S_{ABS}$ (at time t5). Thereafter, the control unit 51 repeats reduction, hold (at time t6) and increase (at time t7) of the braking pressure until the braking slip ratio $S_{ABS1}$ converges on the anti-skid control threshold value $S_{ABS}$.

The anti-skid control for the other wheels 1FR, 1RL and 1RR is effected in the same manner.

Thus the control unit 51 effects both the traction control and the anti-skid control. In this embodiment, the control unit 51 conforms the traction control and the anti-skid control to each other in order to avoid interference therebetween.

Figure 5:
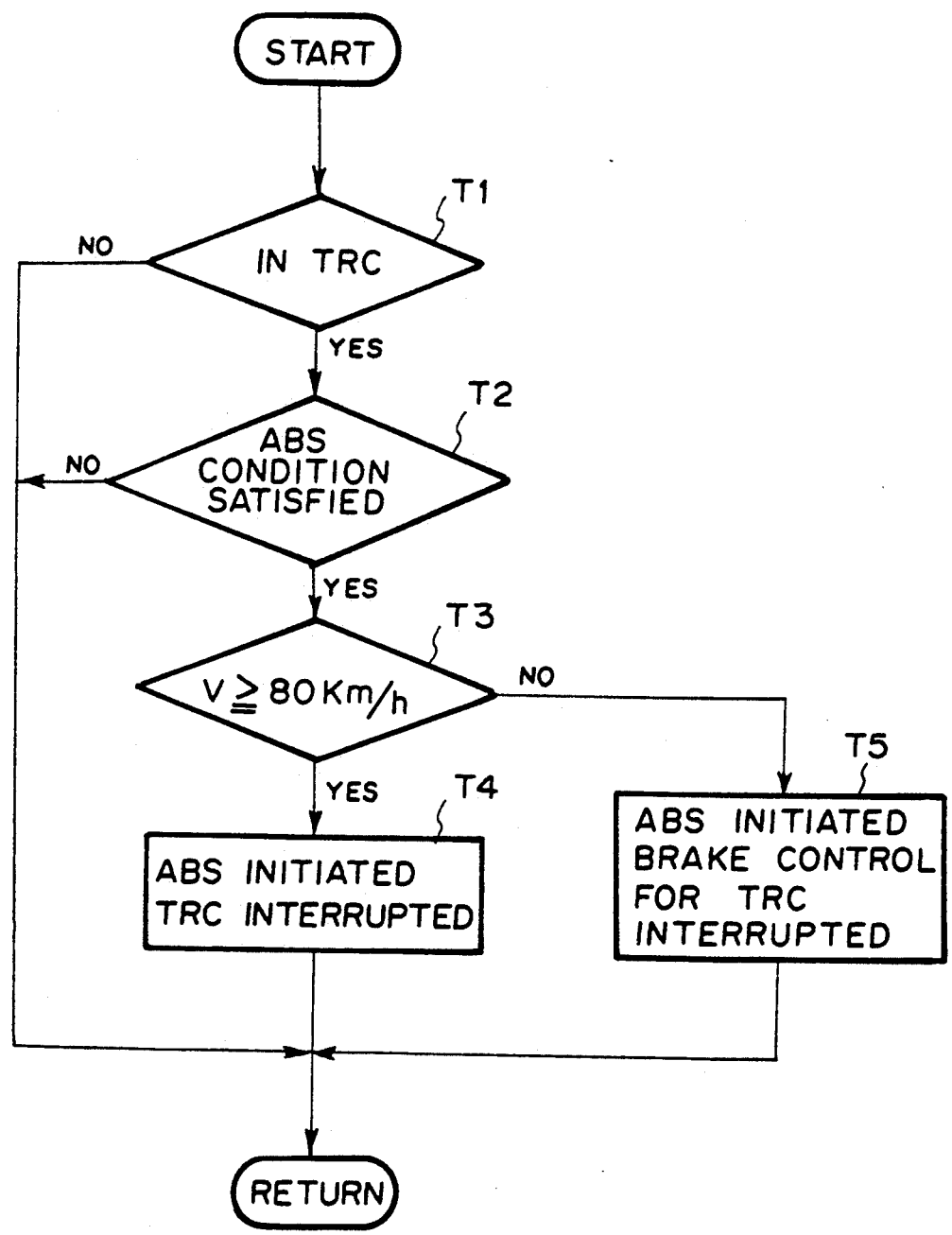
FIGS. 5 and 6 are flow charts for illustrating the operation of the control unit.

That is, as shown in FIG. 5, when the anti-skid control initiating condition is satisfied (e.g., when the braking slip ratio $S_{ABS1}$ exceeds the anti-skid control threshold value $S_{ABS}$) during the traction control (Steps T1 and T2), the control unit 51 interrupts the traction control (both the engine output torque control and the brake control) and immediately initiates the anti-skid control when the vehicle speed V at that time is not lower than a predetermined value which is 80 Km/h in this particular embodiment (steps T3 and T4) while the control unit 51 interrupts the brake control in the traction control with the engine output torque control continued and initiates the anti-skid control when the vehicle speed V at that time is lower than the predetermined value (step T5).

Thus, in this embodiment, when the anti-skid control initiating condition is satisfied during the traction control in the high vehicle speed range, the traction control is immediately interrupted and the anti-skid control is initiated. Accordingly, the braking slip ratio is surely reduced and the behavior of the vehicle is stabled. On the other hand, when the anti-skid control initiating condition is satisfied during the traction control in the low vehicle speed range, the traction control by the brake control is interrupted while the traction control by the engine output torque control is continued. Accordingly, in the case where the traction control is to be resumed after the braking slip is suppressed, the traction control can be quickly resumed.

When the traction control and the anti-skid control are simultaneously effected, the signal processing is complicated due to interruption handling and the like and the processing speed must be increased. The necessity of increase of the processing speed is more as the vehicle speed increases. In this embodiment, since the traction control is interrupted in the high vehicle speed range, the signal processing speed need not be so high.

Figure 6:
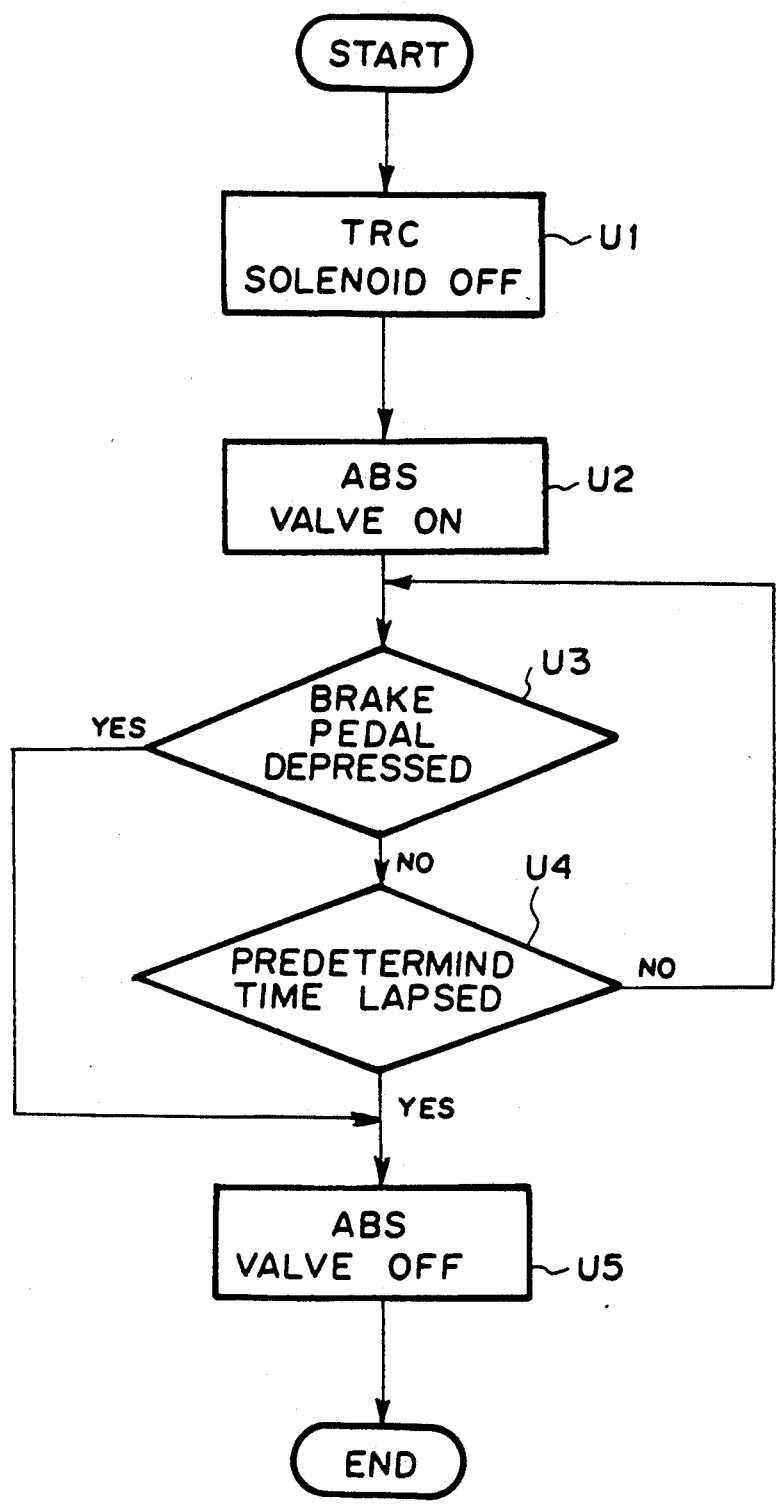

When the brake control in the traction control is to be effected in this embodiment, the three-way solenoid valve 38 is energized and the atmospheric pressure is introduced into the second chamber 35. Accordingly even if the three-way solenoid valve 38 is de-energized to interrupt the brake control in the traction control in step T5 of the flow chart shown in FIG. 5, the atmospheric pressure in the second chamber 35 cannot be immediately released and the braking pressure to the brake is kept applied for a while. When the anti-skid control is initiated while the braking pressure still remains, the anti-skid control cannot be accurately effected. Accordingly, in this embodiment, the steps shown in FIG. 6 are performed following step T5.

That is, the control unit 51 de-energizes the three-way solenoid valve 38 (TRC valve) in step U1 and then energizes the pressure regulator valve 15L or 15R (ABS valve) to release the pressure in the branch brake line 13 or 14 in step U2. Thereafter if the brake pedal 12 is not pushed down, the control unit 51 de-energizes the ABS valve after a predetermined time. (steps U3 to U5) When the brake pedal 12 is pushed down, the control unit 51 immediately de-energizes the ABS valve so the braking pressure can be applied to the brake. (step U3 and U5)

Though, in the embodiment described above, the traction control is effected by control of the engine output torque and application of the brake, the traction control may be effected only control of the engine output torque. In such a case, when the anti-skid control initiating condition is satisfied while the traction control is being effected in the low vehicle speed range lower than 80 Km/h, the anti-skid control is immediately initiated and the traction control is continued. When the anti-skid control initiating condition is satisfied while the traction control is being effected in the high vehicle speed range not lower than 80 Km/h, the traction control is immediately interrupted and the anti-skid control is immediately initiated.

What is claimed:

1. A total slip control system for a vehicle having an engine and a brake for a driving wheel comprising
   an engine output control means which controls the output torque of the engine,
   a brake control means which controls the brake for the driving wheel, and
   a control unit which, when the driving slip ratio of the driving wheel exceeds a predetermined driving slip ratio, causes the engine output control means to control the output torque of the engine so that the driving slip ratio of the driving wheel converges on a target driving slip ratio, thereby effecting traction control, and, when the braking slip ratio of the driving wheel exceeds a predetermined braking slip ratio, causes the brake control means to apply the brake to the driving wheel and to control the braking pressure so that the braking slip ratio of the driving wheel converges on a target braking slip ratio, thereby effecting anti-skid control, wherein the improvement comprises that said control unit interrupts the traction control and initiates the anti-skid control when the braking slip ratio of the driving wheel exceeds said predetermined braking slip ratio during the traction control in a high vehicle speed range not lower than a predetermined speed and said control unit initiates the anti-skid control with the traction control continued when the braking slip ratio of the driving wheel exceeds said predetermined braking slip ratio during the traction control in the low vehicle speed range lower than the predetermined speed.

2. A slip control system as defined in claim 1 in which said control unit effects the traction control on the left and right driving wheels independently from each other.

3. A slip control system as defined in claim 1 in which said predetermined vehicle speed is a vehicle speed above which behavior of the vehicle becomes unstable when the traction control and the anti-skid control are simultaneously effected.

4. A total slip control system for a vehicle having an engine and a brake for a driving wheel comprising
 an engine output control means which controls the output torque of the engine,
 a brake control means which controls the brake for the driving wheel, and
 a control unit which, when the driving slip ratio of the driving wheel exceeds a predetermined driving slip ratio, causes the engine output control means to control the output torque of the engine and/or the brake control means to apply the brake so that the driving slip ratio of the driving wheel converges on a target driving slip ratio, thereby effecting traction control, and, when the braking slip ratio of the driving wheel exceeds a predetermined braking slip ratio, causes the brake control means to apply the brake to the driving wheel and to control the braking pressure so that the braking slip ratio of the driving wheel converges on a target braking slip ratio, thereby effecting anti-skid control, wherein the improvement comprises that said control unit interrupts the traction control and initiates the anti-skid control when the braking slip ratio of the driving wheel exceeds said predetermined braking slip ratio during the traction control in a high vehicle speed range not lower than a predetermined speed and said control unit initiates the anti-skid control with the traction control by application of the brake interrupted and the traction control by control of the engine output torque continued when the braking slip ratio of the driving wheel exceeds said predetermined braking slip ratio during the traction control in the low vehicle speed range lower than the predetermined speed.

5. A slip control system as defined in claim 4 in which said control unit causes the engine output control means to initiate control of the output torque of the engine when the driving slip ratio of the driving wheel exceeds a first predetermined driving slip ratio and causes the brake control means to initiate application of the brake together with the engine output torque control when the driving slip ratio of the driving wheel keeps to increase and exceeds a second predetermined driving slip ratio even after the initiation of the engine output torque control.

6. A slip control system as defined in claim 5 in which said control unit causes the brake control means to interrupt application of the brake while causing the engine output control means to continue the engine output torque control when the driving slip ratio of the driving wheel reduces to said second predetermined driving slip ratio.

* * * * *